3,372,399
RECORDER WITH PIVOTALLY MOUNTED CHART TRANSPORT UNIT
Arthur Ernest Mason, Riplingham, Brough, England, assignor to The Associated Portland Cement Manufacturers Limited, London, England, a corporation of the United Kingdom
Filed Oct. 4, 1966, Ser. No. 584,128
Claims priority, application Great Britain, Oct. 5, 1965, 42,195/65
7 Claims. (Cl. 346—49)

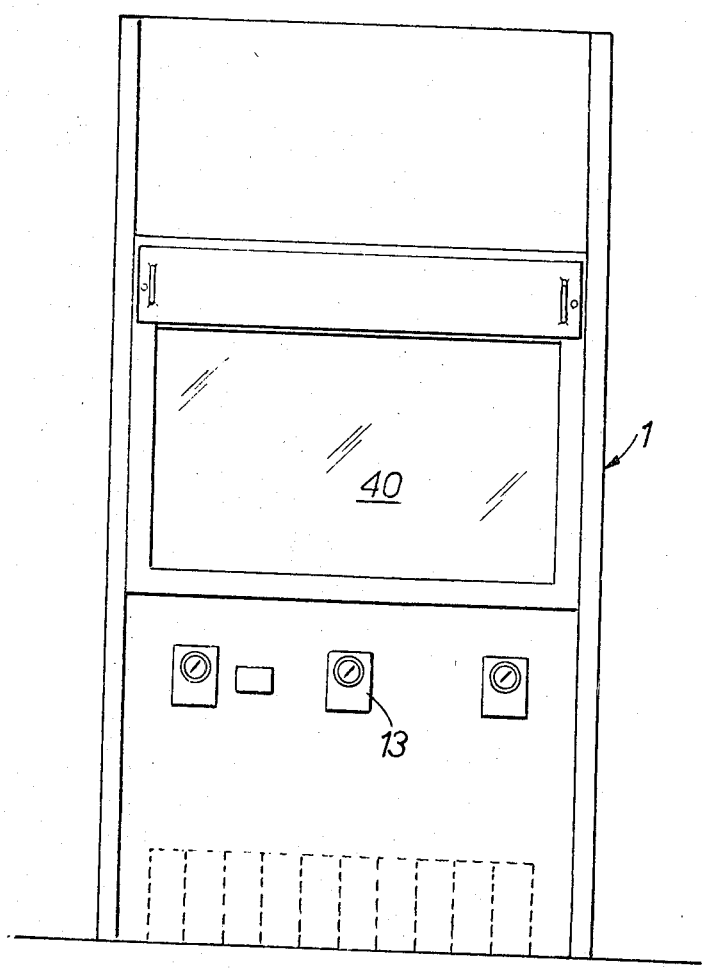

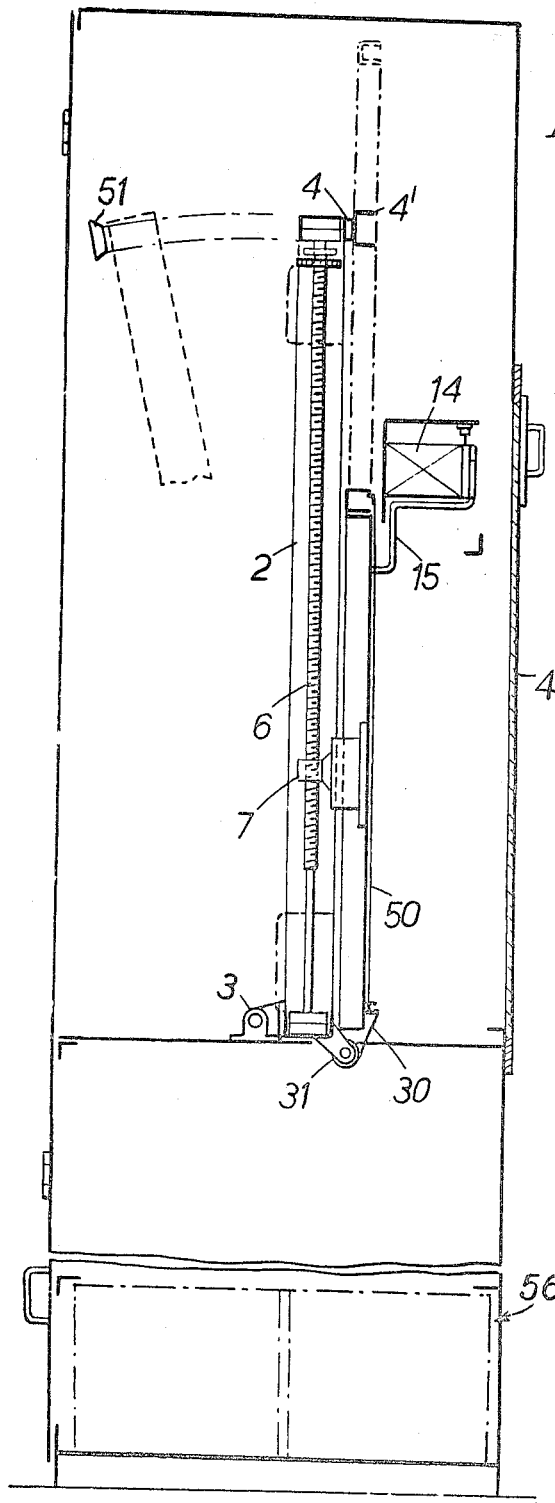
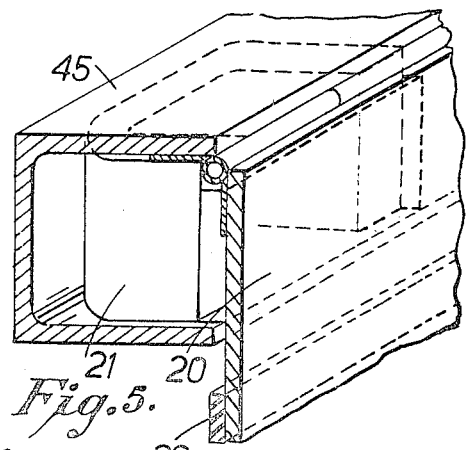
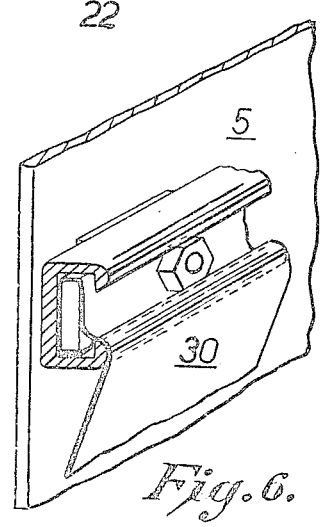
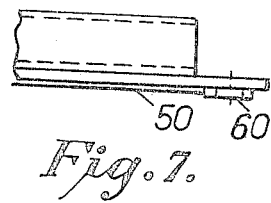

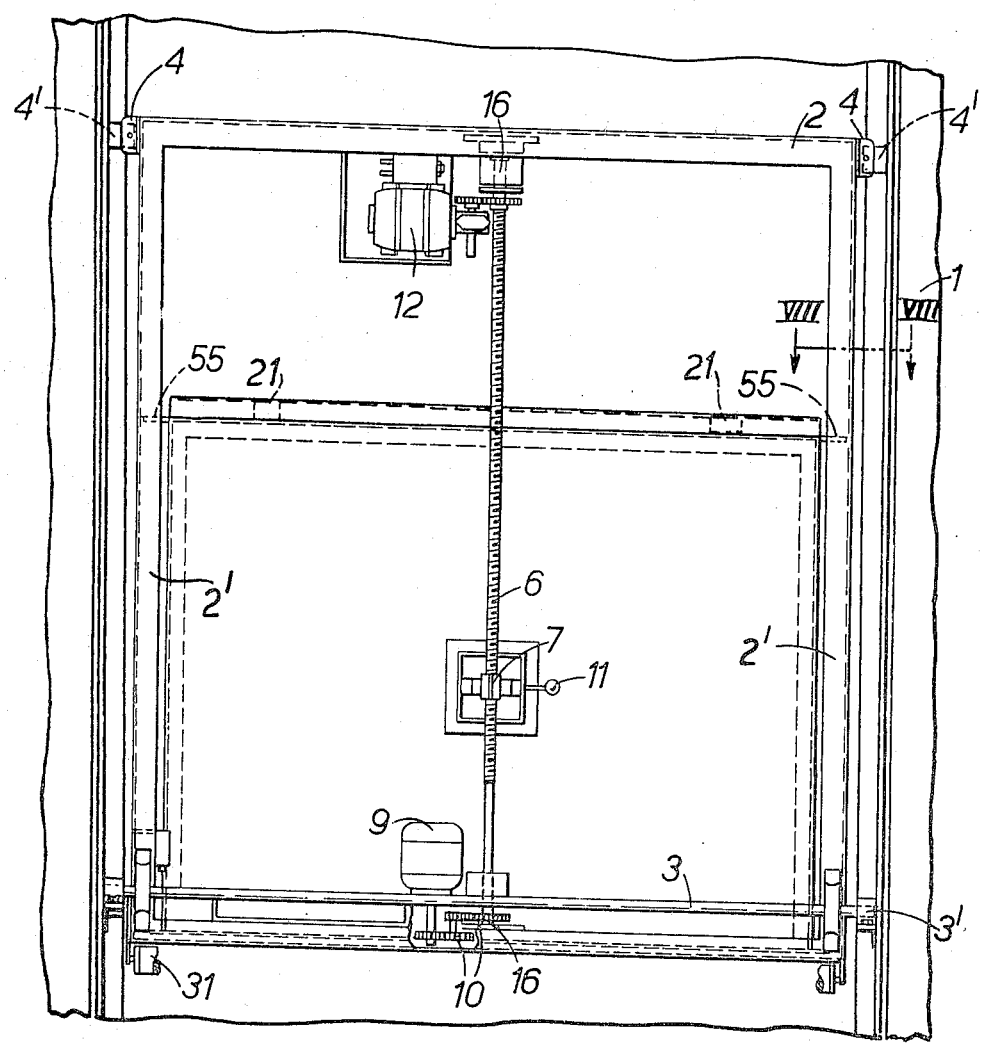

ABSTRACT OF THE DISCLOSURE

The guide frame and drive for a linearly movable flat chart support is pivotally mounted at an end remote from the bank of recording pens to permit movement of the entire assembly out of the plane of the pens both for replacement of the chart and return of the chart support to a starting position. Auxiliary motor means, normally declutched, is provided for rapid drive of the support back to its start position when the normal drive motor is declutched.

---

Figure 3:
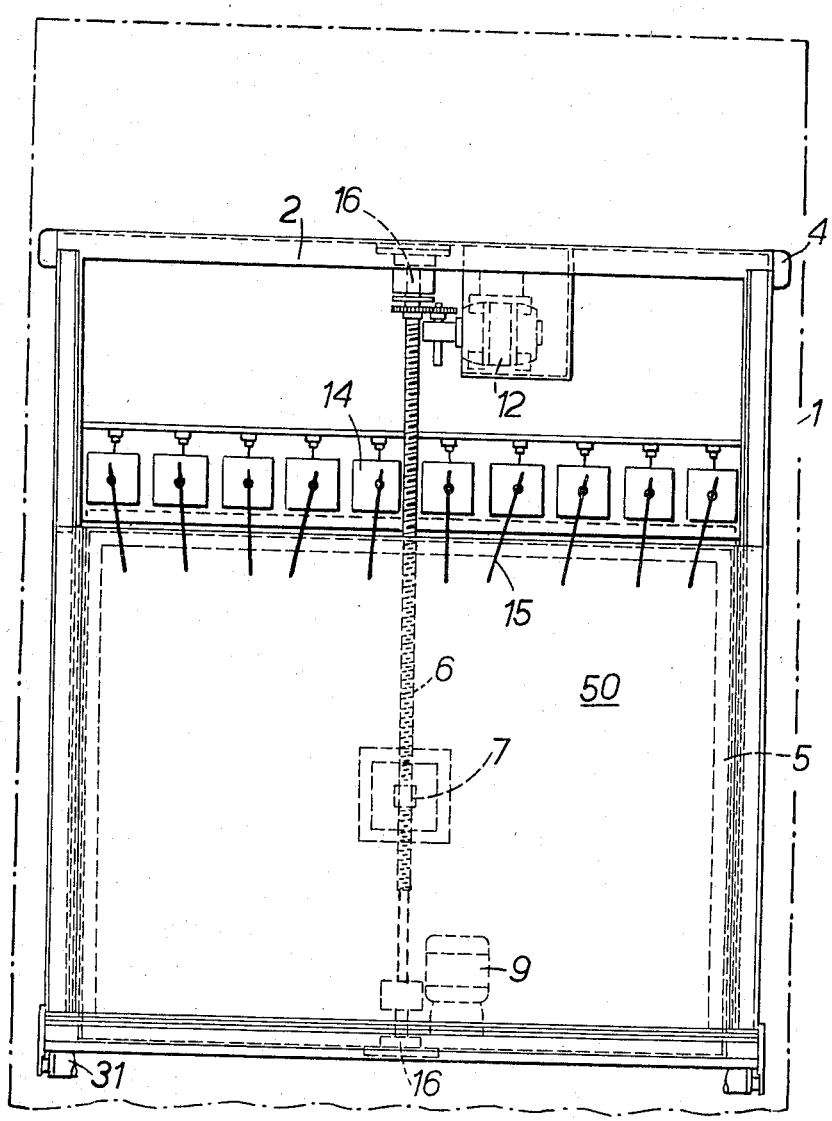

The use of a long rolled chart is, in certain cases, inconvenient. Thus if, for a particular recorder, it is desired to store and later readily to examine records each corresponding to, for example, one day, it is usual to cut each record off the roll before starting the next record. Such cut records frequently do not lie flat and, for storage in certain modern filing systems, must be accurately cut to size; furthermore, if a record is to remain readily visible while being made, more than half of a roll of chart paper may be wasted in cutting off and in reloading the take-up spool.

The present invention therefore provides means for pen recording on a single chart sheet moved as a whole, it being possible to use a chart which is cut to a predetermined size, before being mounted in the recorder.

According to this invention, a moving chart recorder comprises a casing having a chart transport unit and a plurality of recording pens for use in combination therewith, the chart transport unit comprising a chart support member having a substantially plane face to which, when in use, a chart is attached; driving means for moving the support member, when in use, in a linear direction, according to one quantity to be recorded; means for transmitting movement to the pens which is a function of the measurement or measurements to be recorded; means for rendering the drive means to the support member inoperative to permit the latter to be returned to the start position and means by which the transport unit is normally supported within the casing in a plane for contact with the recording pens but permits it to be withdrawn to an inoperative or retracted position.

The support member may comprise a plate mounted for movement in vertical guides. The drive means for moving the support member may comprise a feed screw and nut, a crank mechanism or a lever mechanism. Alternatively, the guides and the drive means may be combined, for example a system of levers such as a lazy tongs mechanism.

The invention is illustrated in the accompanying drawings in which:

FIGURE 1 is a front elevation of a cabinet in which a moving chart recorder in accordance with the invention is housed, FIGURE 2 is a side elevation, one wall of the cabinet having been removed to show the recorder, FIGURE 3 is a front elevation of the recorder, FIGURE 4 is a corresponding view from the rear of the recorder, FIGURES 5, 6 and 7 are detailed views of parts of the recorder, FIGURE 8 is a detail section on line VIII—VIII of FIGURE 4.

Referring to the drawings, the recording device of this invention comprises a metal cabinet 1 housing a chart transport unit in the form of a rectangular frame 2 formed of channel section, and a secondary frame 5 slidably mounted in guides in frame 2, the secondary or chart frame forming a support member for a chart, on which, when in operation, records are transcribed from a series of pen recorders indicated generally at 14 (FIGURE 2).

The main frame 2 is hingedly supported along its lower edge by means of a trunnion device including a rod 3 journalled at its ends in fulcrums 3' on the sides of the casing so that the frame 2, including the slidable frame 5 for the chart, i.e. the chart transport unit, can be swung from its vertical or operating position as shown in full lines in FIGURE 2, to the dotted line position where it rests against resilient stops 51 at opposite sides of the casing.

When in its operating and upright position the frame 2 is held by magnets 4 attached to the upper ends of the side members of the main frame. The secondary frame 5 in which the chart is carried is provided with a flat front, and as shown in detail in FIGURE 8, the chart frame 5 is slidable up and down between upper and lower limit positions, being provided with lateral extensions 55 for engagement in slides which conveniently may consist of Hilladam Flyside bearing sliding door guides, diagrammatically indicated at 79.

Movement of the chart frame 5 in the main frame 2 is controlled by a feed screw 6 which is mounted at the rear of the plate 5 in bearings 16 attached to the top and bottom bars of the frame 2, the feed screw engaging with a nut 7 fixed to the back of the plate 5.

Drive to the feed screw when recording is from a synchronous electric motor 9 on the frame 2, the motor being coupled to the feed screw 6 by means of a gear train 10 designed to provide a desired rate of travel of the nut and thus of the chart frame 5 proportional to the motor supply frequency.

When the motor 9 is supplied with alternating current at a constant frequency, the rate of downward movement of the plate will be proportional to time. However, if the frequency of the motor supply current be varied, then the plate will move at a rate which varies accordingly.

To enable the chart frame to be moved in an upward direction where only one drive motor is provided, the return (upward) movement being effected by hand, it is necessary to release the frame from the feed screw for which purpose provision is made for the nut 7 to be disengaged from the feed screw, it being understood that before the frame can be returned to its upper or start position, it is necessary to disengage it from contact with the recording pens by swinging the main frame complete with the chart frame rearwardly to the dotted line position shown in FIGURE 2.

By using a half nut or split nut of known construction the latter can be disengaged from the feed screw to enable the chart frame to be raised manually and returned to the start or other desired position, when the nut is again engaged with the feed screw 6 preparatory to commencing recording on a new chart. The desired position being selected, the chart is adjusted so that it is synchronized with the motor supply frequency. Disengagement of the nut can be effected through a push and pull rod 11 (FIGURE 4) or other suitable means.

A preferred arrangement however, is to transfer the feed screw drive from the synchronous motor 9 to an induction motor 12 geared to provide a relatively higher speed so that the return movement can readily be completed. Transfer is effected by means of a control switch 13 (FIGURE 1) at the front of the casing which de-energises an electro-magnetic clutch in the normal synchronous drive and energises a similar clutch in the induction motor drive. By fitting a rotary type control switch, drive in an upward direction can be achieved by turning the switch clockwise and in a downward direction by turning it anti-clockwise, the centre position on the switch selecting the normal synchronous drive.

Where the synchronous motor 9 receives power from a time-controlled mains supply, it is a simple matter to impart a time-controlled movement to the feed screw 6 for a chart having a time-scale extending over 24 hours. Assuming that the time-scale on the chart is 24 inches long, the plate can be arranged to move at a rate of one inch an hour. Other time ranges may, however, be adopted with the corresponding arrangements of the plate drive means.

The recording elements and their pens are arranged in a line across the width of the frame 2, i.e. in a direction at right angles to the direction of movement of the chart frame 5, each pen or, where the pens are double banked, each pair of pens, recording in a selected vertical zone on the chart, a vertical zone of the chart being allocated to each pen or pair of pens. The embodiment illustrated in FIGURE 3 shows double banks of pens 14 of which there are ten carried on a bracket extending across the entire width of the casing 1. The pens 15 which have a capillary action, extend downwardly and rearwardly, to enable the pen tips which terminate in a common plane, to make contact with an initial datum line on the chart 50 when the plate is at its upper limit position. The pen drive units and their mountings are located in front of the path of movement of the plate so that while the pens will make written contact therewith, there is no interference with its movement.

The pen drive units 14 may be electrically or pneumatically operated. Provision is made for each pen drive unit to be removable by arranging a make and break connection, for example, a plug and socket, in the case of electrical units, or by corresponding pipe connections in the case of pneumatic units. Electric and pneumatic pen units may be arranged to be interchangeable with each other. The recorder being provided with connection means for both types, a single multipen recorder may then be provided, at will, wholly with pen units of either kind, or with some of one kind and some of another.

To replace the chart 50, magnets 4 holding the frame 2 in an upright position are disengaged, when the frame 2 is free to be tilted backwards say through an angle of 30° and clear of the pen tips, so that the latter do not obstruct the face of the plate.

Referring to FIGURE 5, the plate or chart frame 5 at its upper end is provided with a housing 45 to which a steel flap 20 is hingedly connected, the flap being held against the front face of the plate 5 by magnets arranged in the housing, one of which is shown at 21. The flap 20 operates as a clamp since when the magnets are engaged the flap will hold the chart to the face of the plate; a sponge rubber strip 22 may be fixed to the flap to increase the adhesion.

By attaching a blind 30 to the frame 5 at its lower edge provision may be made for obscuring the mechanism from view; as the frame moves upwardly the blind is unwound from a roller 31.

The housing 1 is closed at the front by metal panels, except for an area facing the front face of the plate, when the plate is at the lower stop position. This area is provided with a slidable glass window 40, counter-balanced so that it can readily be slid upwardly, to allow access to the chart and pen units. This window allows both the pen tips and recorded traces to be examined from the front of the apparatus; to assist in such examination of a fluorescent lamp (not shown) is placed within the housing above the window.

The housing may conveniently include mounting means, and electric connection means, enabling selected interchangeable associated electronic circuit units to be mounted in the housing and connected to corresponding pen drive units.

Guide strips 60 (FIGURE 7) are provided on the plate 5 to enable the chart to be accurately positioned.

In operation at the start of a recording period and assuming that the chart bearing the previous day's record or a previous run has not been removed, at which time the chart frame will be at the bottom or far end of the slides 79 of the frame 2, it is necessary before returning the chart frame to the upper or start position to swing the chart support unit to its inoperative or withdrawn position so that it will not be obstructed by the pens. This is done by pulling the main frame 2 to release its hold by magnets 4. The return of the chart frame 5 can be carried out manually having first released the screw drive or by switching over to the induction motor 12. Having returned the chart frame to its start position, and while the frame 2 remains withdrawn it is a simple matter to replace the used chart with a new one. On replacement of the chart the frame 2 is returned to vertical or normal position to enable the pens to operate and the feed screw re-engaged, or the drive switched over from the induction motor 12 to the motor 9 to drive the chart frame 5.

The instrument compartment is indicated at 56 in which is housed the recording units associated with the respective pens.

What is claimed is:

1. A moving chart recorder comprising a casing; a chart transport unit housed within the casing and mounted for movement between a first plane for recording and a second plane; a chart support member having a plane face, to which when in use a chart is attached, mounted on said transport unit for linear movement relative thereto according to a quantity to be recorded; means for interchangeably attaching a chart to said support member, said chart having a series of recording zones extending in a direction parallel to its direction of movement; a plurality of recording elements each having at least one recording pen and being fixedly secured within the casing, said recording elements being disposed relative to said chart transport such that when the latter lies in said first plane said pens will engage a chart on said support member and record within corresponding zones thereon; releasable means within the casing by which said chart transport unit is normally retained in said first plane but which permits withdrawal of said unit to said second plane such that a chart on said support member is clear of the recording pens to permit return of the chart support member to a starting position without inscribing a trace and to enable its replacement; drive means for imparting said linear movement to said chart support member; means for energizing said recording elements as a function of the measurements to be simultaneously recorded on the chart; and means for rendering said drive means inoperative to permit said support member to be returned to said starting position.

2. A moving chart recorder as claimed in claim 1, wherein the drive means for moving the chart support member includes a feed screw element and a nut element, one of said elements being driven and the other element being attached to said chart support member.

3. A moving chart recorder as claimed in claim 2, wherein said feed screw element is driven and said drive means comprises synchronous motor means coupled to said feed screw element through reduction gearing.

4. A moving chart recorder as claimed in claim 3, wherein said chart support member comprises a plate and said chart transport unit a rectangular frame extending vertically within the casing when lying in said first plane, said frame having guides within which said plate is slidably mounted for movement between opposite limit positions.

5. A moving chart recorder as claimed in claim 3, wherein there is provided auxiliary motor means to drive said feed screw element in reverse for returning said chart support member to said starting position and in which the drive connection from each of said motor means to said feed screw element includes an electro-magnetic clutch device to disconnect one motor means and connect the other motor means and vice versa.

6. A moving chart recorder as claimed in claim 1, in which said chart transport unit is hingedly supported about one end remote from the recording pens for rotational movement between said planes.

7. A moving chart recorder as claimed in claim 6, wherein said releasable means comprise magnetic latch means for retaining said transport unit in said first plane.

References Cited
UNITED STATES PATENTS

| | | | |
|---|---|---|---|
| 1,323,058 | 11/1919 | Hughes | 346—134 X |
| 2,033,177 | 3/1936 | Borden | 346—129 |
| 2,181,867 | 12/1939 | Cameron | 346—129 |
| 2,657,969 | 11/1953 | Haynes | 346—134 |
| 2,702,736 | 2/1955 | Niemann | 346—112 X |

RICHARD B. WILKINSON, *Primary Examiner.*

JOSEPH W. HARTARY, *Assistant Examiner.*